(12) United States Patent
Wang et al.

(10) Patent No.: US 10,891,471 B2
(45) Date of Patent: *Jan. 12, 2021

(54) METHOD AND SYSTEM FOR POSE ESTIMATION

(71) Applicant: Beijing SenseTime Technology Development Co., Ltd, Haidian District (CN)

(72) Inventors: Xiaogang Wang, Shatin N.T. (CN); Xiao Chu, Shatin N.T. (CN); Wanli Ouyang, Shatin N.T. (CN); Hongsheng Li, Shatin N.T. (CN)

(73) Assignee: Beijing SenseTime Technology Development Co., Ltd, Haidian District (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/238,347

(22) Filed: Jan. 2, 2019

(65) Prior Publication Data

US 2019/0138799 A1 May 9, 2019

Related U.S. Application Data

(63) Continuation of application No. 16/089,590, filed as application No. PCT/CN2016/077505 on Mar. 28, 2016.

(51) Int. Cl.
*G06K 9/00* (2006.01)
*G06K 9/46* (2006.01)
*G06K 9/62* (2006.01)

(52) U.S. Cl.
CPC ..... *G06K 9/00335* (2013.01); *G06K 9/00362* (2013.01); *G06K 9/469* (2013.01); *G06K 9/6262* (2013.01)

(58) Field of Classification Search
CPC .......... G06K 9/00335; G06K 9/00362; G06K 9/469; G06K 9/6262
See application file for complete search history.

(56) References Cited

U.S. PATENT DOCUMENTS 9,530,047 B1 * 12/2016 Tang ................. G06K 9/00288
10,474,883 B2 * 11/2019 Yu .................... G06K 9/00288
(Continued)

FOREIGN PATENT DOCUMENTS

CN     1573660 A    2/2005
CN   102509086 A    6/2012
(Continued)

OTHER PUBLICATIONS

Transferring Rich Feature Hierarchies for Rubust Visual Tracking by Niayan Wang (Year: 2015).*
Visual Tracking with Fully Convolution Network by Lijun Wang (Year: 2015).*
(Continued)

*Primary Examiner* — Nizar N Sivji
(74) *Attorney, Agent, or Firm* — Garvey, Smith & Nehrbass, Patent Attorneys, L.L.C.; Seth M. Nehrbass; Fabian M. Nehrbass (57) ABSTRACT

A method and a system for pose estimation are provided. The method includes: extracting a plurality of sets of part-feature maps from an image, each set of the extracted part-feature maps encoding the messages for a particular body part and forming a node of a part-feature network; passing a message of each set of the extracted part-feature maps through the part-feature network to update the extracted part-feature maps, resulting in each set of the extracted part-feature maps incorporating the message of upstream nodes; estimating, based on the updated part-feature maps, the body part within the image.

15 Claims, 4 Drawing Sheets

(56) References Cited

U.S. PATENT DOCUMENTS

| | | | |
|---|---|---|---|
| 2004/0148268 A1* | 7/2004 | Reil | B25J 9/161 |
| | | | 700/247 |
| 2006/0098865 A1* | 5/2006 | Yang | G06K 9/00362 |
| | | | 382/159 |
| 2007/0268295 A1 | 11/2007 | Okada | |
| 2009/0154796 A1 | 6/2009 | Gupta et al. | |
| 2009/0252423 A1* | 10/2009 | Zhu | G06K 9/00201 |
| | | | 382/209 |
| 2010/0278384 A1* | 11/2010 | Shotton | G06K 9/00369 |
| | | | 382/103 |
| 2013/0271458 A1 | 10/2013 | Andriluka et al. | |
| 2014/0002338 A1 | 1/2014 | Raffa et al. | |
| 2015/0006444 A1* | 1/2015 | Tamatsu | G06N 3/082 |
| | | | 706/12 |
| 2015/0139485 A1* | 5/2015 | Bourdev | G06K 9/6292 |
| | | | 382/103 |
| 2016/0063359 A1* | 3/2016 | Szegedy | G06K 9/66 |
| | | | 382/158 |
| 2017/0228587 A1* | 8/2017 | Zhang | G06K 9/469 |
| 2017/0243053 A1* | 8/2017 | Li | G06K 9/00281 |

FOREIGN PATENT DOCUMENTS

| | | |
|---|---|---|
| CN | 103824062 | 5/2014 |
| CN | 104063677 | 9/2014 |

OTHER PUBLICATIONS

PCT International Search Report and the Written Opinion of the International Searching Authority, International App. No. PCT/CN2016/077505, dated Nov. 23, 2016.

Office Action for China Application No. 201680083830.2, dated Jan. 20, 2020, National Intellectual Property Administration (Chinese Patent Office).

Office Action for China Application No. 201680083830.2, dated Jan. 20, 2020, National Intellectual Property Administration (Chinese Patent Office)—English Translation.

Human Pose Estimation in Static Images, Xiao Ding (Tutor: Professor Xiangbin Shi), published Jan. 15, 2016.

Human Pose Estimation in Static Images, Xiao Ding (Tutor: Professor Xiangbin Shi), published Jan. 15, 2016—English Translation.

* cited by examiner

METHOD AND SYSTEM FOR POSE ESTIMATION

CROSS REFERENCE TO RELATED APPLICATION

This application is a continuation of U.S. patent application Ser. No. 16/089,590, filed Sep. 28, 2018, which is a U.S. National Stage under 35 USC 371 of PCT/CN2016/077505, filed on Mar. 28, 2016 and entitled "METHOD AND SYSTEM FOR POSE ESTIMATION", the entire disclosure of which is hereby incorporated by reference.

TECHNICAL FIELD

The application relates to a method and a system for pose estimation.

BACKGROUND

Human pose estimation is to estimate locations of body parts from images, which could be applied to a variety of vision tasks, such as action recognition, tracking, and human-computer interaction. Despite the long history of efforts, pose estimation is still a challenging and unsolved problem. The large variations in limb orientation, clothing, viewpoints, background clutters, truncation, and occlusion make pose estimation even more difficult.

It is known that pose estimation has been achieved by refining appearance score maps generated from input images. Regarding the score maps, the information on visual patterns at a location is summarized into a single probability value, indicating the likelihood of the existence of the corresponding body part. For example, If a location of an elbow has a large response on the score map, it can be concluded that this location may belong to elbow. However, the in-plane and out-plane rotation of the elbow, the orientations of the upper arm and the lower arm associated with it, the occlusion status, etc., are inconclusive. Such detailed information is valuable for estimating the locations of other body parts, but is lost from the score map, which makes structural learning among body parts less effective.

SUMMARY

The following presents a simplified summary of the application in order to provide a basic understanding of some aspects of the application. This summary is not an extensive overview of the application. This summary neither identifies key or critical elements of the application nor delineates any scope of particular embodiments of the application, or any scope of the claims. Its sole purpose is to present some concepts of the application in a simplified form as a prelude to the more detailed description that is presented later.

It is observed that the inter-part information is well preserved at the feature level, where hierarchical feature representations are learned with Convolutional Neural Networks. In order to address, at least partially, one of the above issues, a method is proposed for pose estimation, in one aspect of the present application. The method includes: extracting a plurality of sets of part-feature maps from an image, each set of the extracted part-feature maps representing a body part and forming a node of a part-feature network; passing a message of each set of the extracted part-feature maps through the part-feature network to update the extracted part-feature maps, resulting in each set of the extracted part-feature maps incorporating the message of upstream nodes; estimating, based on the updated part-feature maps, the body part within the image. The pose estimation accuracy will be enhanced since rich information contained in part-feature maps between body parts can be mostly preserved as a result of message passing process in the feature level.

In at least one embodiment of the present application, the message is passed in opposite directions and each pair of the updated part-feature maps performed in different directions are combined into a score map. The generated score map is used to estimate poses within the image with improved accuracy.

In at least one embodiment of the present application, the part-feature maps are extracted via a Convolutional Neural Network (CNN), and preferably, a Visual Geometry Group (VGG) net.

In at least one embodiment of the present application, only 3 pooling layers of the VGG net are enabled in order to preserve a higher resolution.

In at least one embodiment of the present application, the message is passed through a convolution operation with a geometrical transformation kernel.

In another aspect, a system for pose estimation is provided. The system includes: a memory that stores executable components; and a processor electrically coupled to the memory to execute the executable components for: extracting a plurality of sets of part-feature maps from an image, each set of the extracted part-feature maps representing a body part and forming a node of a part-feature network; passing, node by node, a message of each set of the extracted part-feature maps through the part-feature network to update the extracted part-feature maps, resulting in each set of the extracted part-feature maps incorporating the message of previously passed nodes; estimating, based on the updated part-feature maps, the body part within the image.

In yet another aspect, a non-transitory computer readable storage medium is provided. The storage medium stores computer readable instructions executable by a processor to perform operations including: extracting a plurality of sets of part-feature maps from an image, each set of the extracted part-feature maps representing a body part and forming a node of a part-feature network; passing a message of each set of the extracted part-feature maps through the part-feature network to update the extracted part-feature maps, resulting in each set of the extracted part-feature maps incorporating the message of upstream nodes; estimating, based on the updated part-feature maps, the body part within the image.

BRIEF DESCRIPTION OF THE DRAWING

Exemplary non-limiting embodiments of the present application are described below with reference to the attached drawings. The drawings are illustrative and generally not to an exact scale. The same or similar elements on different figures are referenced with the same reference numbers.

DETAILED DESCRIPTION

Reference will now be made in detail to some specific embodiments of the present application contemplated by the inventors for carrying out the present application. Examples of these specific embodiments are illustrated in the accompanying drawings. While the present application is described in conjunction with these specific embodiments, it will be appreciated by one skilled in the art that it is not intended to limit the present application to the described embodiments. In the following description, numerous specific details are set forth in order to provide a thorough understanding of the present application. The present application may be practiced without some or all of these specific details. In other instances, well-known process operations have not been described in detail in order not to unnecessarily obscure the present application.

The terminology used herein is for the purpose of describing particular embodiments only and is not intended to be limiting of the present application. As used herein, the singular forms "a", "an" and "the" are intended to include the plural forms as well, unless the context clearly indicates otherwise. It will be further understood that the terms "includes" and/or "including" when used in this specification, specify the presence of stated features, integers, steps, operations, elements, and/or components, but do not preclude the presence or addition of one or more other features, integers, steps, operations, elements, components, and/or groups thereof.

Figure 1:
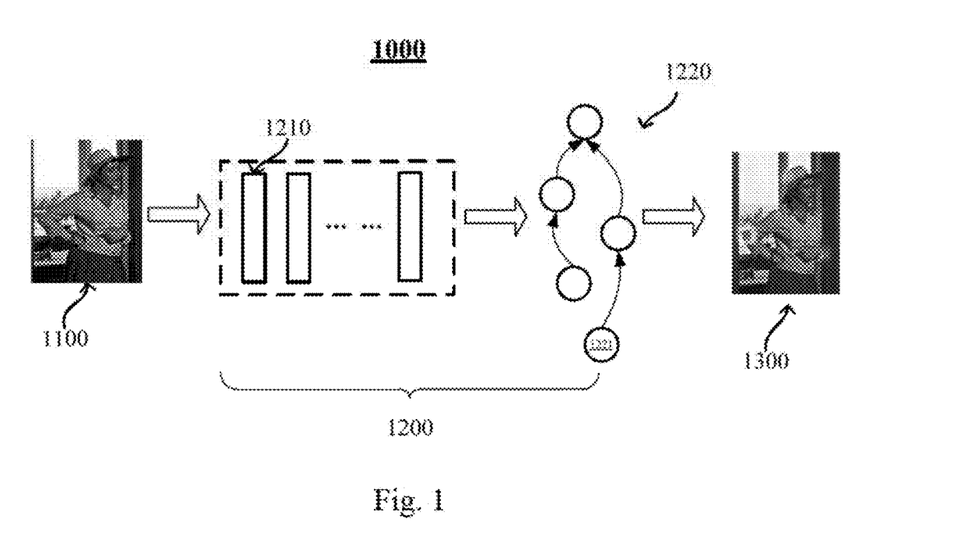
FIG. 1 is a schematic diagram illustrating an exemplary system for estimating poses from an input image according to one embodiment of the present application.

An exemplary system 1000 for estimating poses from an input image will now be described with reference to FIG. 1. A Convolutional Neural Network (CNN) 1200 is utilized to generate semantically meaningful representations from an input image 1100. It is appreciated that the CNN 1200 may employ multiple layers 1210 to learn hierarchical feature representations of input images. Features in lower layers capture low-level information, while those in higher layers can represent more abstract concepts, such as attributes and object categories. In this embodiment, the CNN 1200 employs, for example, 7 layers. Widely used CNNs, such as AlexNet, Clarifai, Overfeat, GoogleNet, and Visual Geometry Group (VGG), employ fully connected (fc) layers following convolutional layers to obtain global feature vectors. In Fully Convolutional Nets (FCNs), a 1×1 convolution framework is used to replace the fc layers. In this embodiment, a fully convolutional VGG net is preferably chosen as a base model. In a preferred embodiment, only 3 pooling layers out of 5 are enabled in order to preserve a higher resolution. A feature vector obtained at location (x, y) in layer fcn6 is denoted by $h_{fcn6}(x,y)$. The feature vector for body part k at location (x, y) extracted from layer fcn6 is computed as $$h_{fcn7}^k(x,y)=f(h_{fcn6}(x,y)\otimes w_{fcn7}^k) \quad (1)$$

wherein $\otimes$ denotes a convolution operation, f denotes a nonlinear function, and $w_{fcn7}^k$ denotes a filter bank for part k. It should be noted that, $h_{fcn7}^k$ contains a set of part-feature maps extracted from different channels. The part-feature maps of body parts contain rich information and detailed descriptions of human poses and appearance.

Since spatial distributions and co-occurrence of part-feature maps obtained at different parts are highly correlated, passing the rich information contained in part-feature maps between parts can effectively improve features learned at each part. In the prior art, the passing process is implemented in the score map level, which results in the loss of important inter-part information. Surprisingly, when a message passes through at the feature level, the rich information contained in part-feature maps between parts is largely preserved.

In the present application, the geometric constraints among body parts could be consolidated by shifting part-feature maps of one body part towards neighboring parts. The geometrical transformation kernels model the relationship between every pair of part-feature maps from neighboring parts. To optimize features obtained at a part, it is expected to receive information from all other parts with a fully connected graph. However, in order to directly model the relationship between part-feature maps of parts in distance, large transformation kernels, which are difficult to be trained, have to be introduced. Second, the relationships between some parts (such as head and foot) are unstable. It is advantageous to pass message between them through intermediate parts on a designed graph, since the relative spatial distribution between the two adjacent parts is stable and the corresponding kernel is easy to be trained. The adjacent parts on the graph are close in distance and have relatively stable relationship in the graph. The extracted sets of part-feature maps constitute a part-feature network processed by a structured feature learning layer 1220, wherein each set of part-feature maps occupies a node 1221 in the part-feature network. In an exemplary implement, a message of each set of the extracted part-feature maps is passed through the part-feature network along a unitary direction. The passing operation will be illustrated in detail with reference to FIG. 6. After the message passing, each set of the part-feature maps are updated through message passing in the part-feature network. As a result, each set of the part-feature maps incorporates the message of previously passed nodes, except for the part-feature map occupying the leaf node. In a preferred embodiment, the updated part-feature maps are transformed (linearly combined, for example) into score maps from which the part positions of a final image 1300 can be estimated. With the updated part-feature maps, the pose estimation can achieve a higher accuracy.

Figure 2:
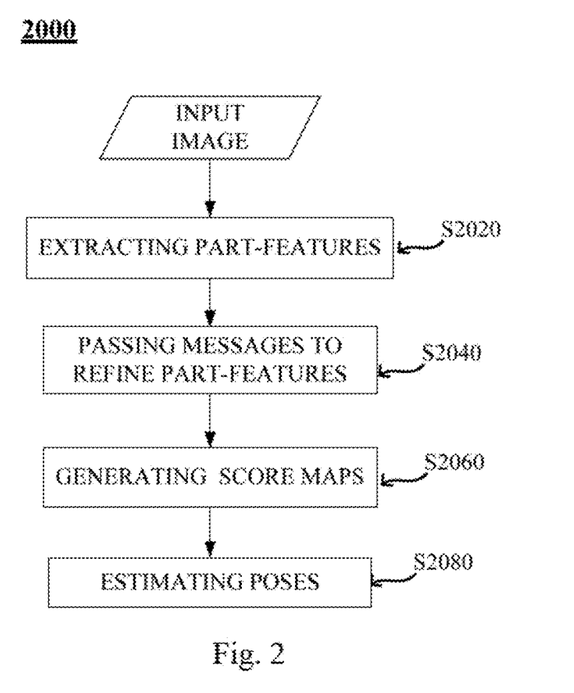
FIG. 2 is a flow chart illustrating a process for estimating poses from an input image according to one embodiment of the present application.

The flow chart illustrating a process for estimating poses from an input image is schematically shown in FIG. 2. A plurality of sets of part-feature maps are extracted, through a CNN, from an input image at step S2020. The extracted part-feature maps are sorted into a plurality of sets representing various parts of a human body, respectively. In an exemplary embodiment, the extracted sets of part-feature maps constitute a body-like network. A message of each set of the extracted part-feature maps is passed through the network at step 2040. In a preferred embodiment, the updated part-feature maps are linearly combined into score maps at step S2060. Based on the score maps, the poses within the image are detected out at step S2080.

Figure 3:
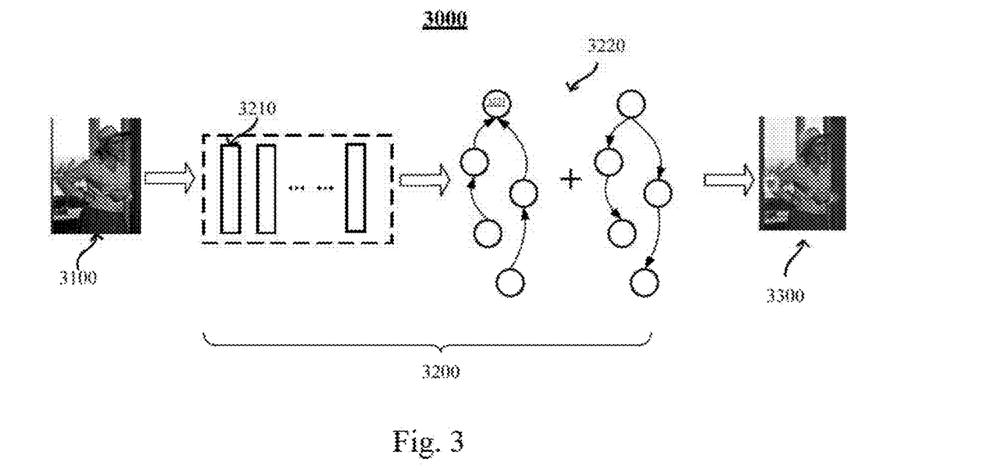
FIG. 3 is a schematic diagram illustrating another exemplary system for estimating poses from an input image according to one embodiment of the present application.

Referring to FIG. 3, an alternative embodiment of pose estimation system 3000 is provided. The system 3000 is similar to the above-mentioned system 1000 except for the structured feature learning layer 3220 included in the CNN 3200. The CNN 3200 includes a plurality of layers 3210 to learn hierarchical feature representations of input images. Each set of part-feature maps occupies a node 3221 in the part-feature network. In this embodiment, the message is passed bi-directionally through the part-feature network, which enables the extracted part-feature maps incorporating the message of adjacent nodes in two directions. The updated pairs of part-feature maps in opposite directions are combined into score maps which further improve the pose estimation accuracy. According to the embodiment, the estimation accuracy of the pose in a final image 3300 may be improved.

Figure 4:
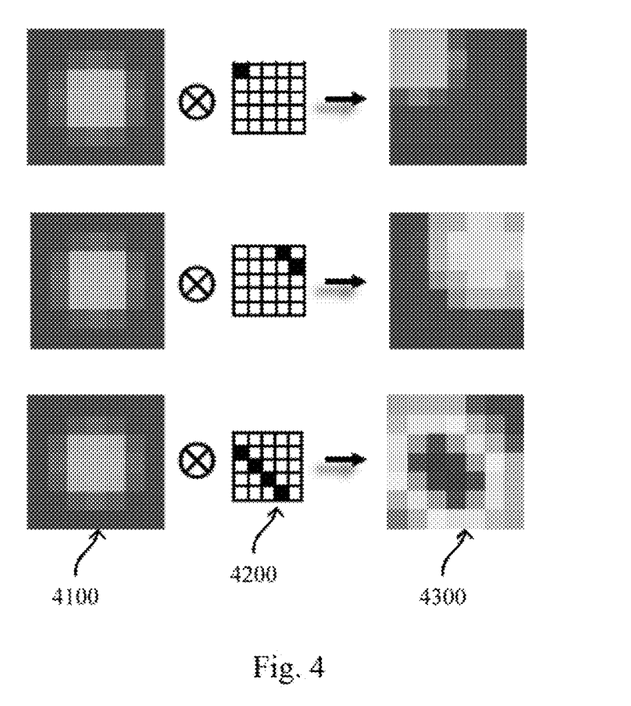
FIG. 4 is a schematic diagram illustrating a geometrical transformation process according to one embodiment of the present application.
Figure 5:
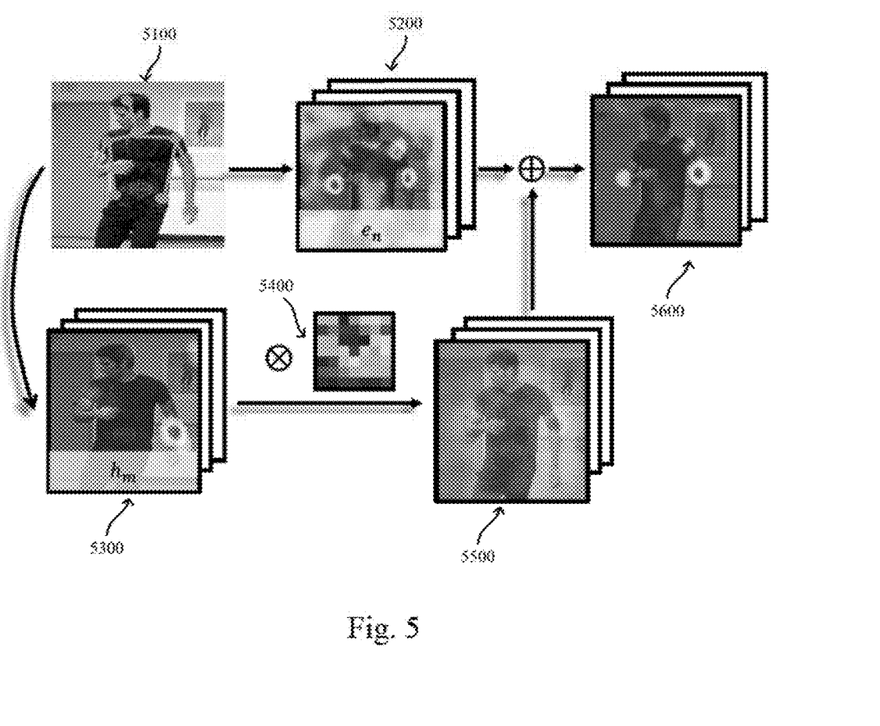
FIG. 5 is a schematic diagram illustrating a feature map updating operation according to one embodiment of the present application.

FIG. 4 and FIG. 5 illustrate a detailed geometrical transformation operation that can be utilized in message passing. As shown in FIG. 4, a feature map 4100 under Gaussian distribution is provided. Three different geometrical transformation kernels 4200 are convoluted with the same feature map 4100, respectively, resulting differently transformed feature maps 4300. As can be seen from FIG. 4, the transformed feature maps have been shifted towards top-left, top-right, and bottom-left, respectively. In pose estimation, the geometric constraints among body parts can be consolidated by shifting the feature map of one body part towards adjacent body parts. The geometrical transformation kernels model the relationship between each pair of feature maps of adjacent parts. In order to schematically illustrate the process described above, an example is shown in FIG. 5. Feature maps 5200 and 5300 representing an right elbow and a right lower arm, respectively, are extracted from an input image 5100. One of the lower-arm feature maps 5300 has a high response, since the lower-arm feature map 5300 is extracted from a channel describing downward lower arm without clothes covered. An elbow feature map 5200, positively correlated with the lower-arm feature map 5300, also has a high response. It is expected to use the lower-arm feature map 5300 to reduce false alarms and enhance the response on the right elbow. However, it is not suitable to add the elbow feature map 5200 directly to the lower-arm feature map 5300, since there is a spatial mismatch between the two joints. Instead, the lower-arm feature map 5300 is shifted towards the right elbow through a convolution operation with a geometrical transformation kernel 5400 as described above. Afterwards, a transformed feature map 5500 is combined with the elbow feature map 5200 to generate an updated feature map 5600, leading to an improved pose estimation result.

Figure 6:
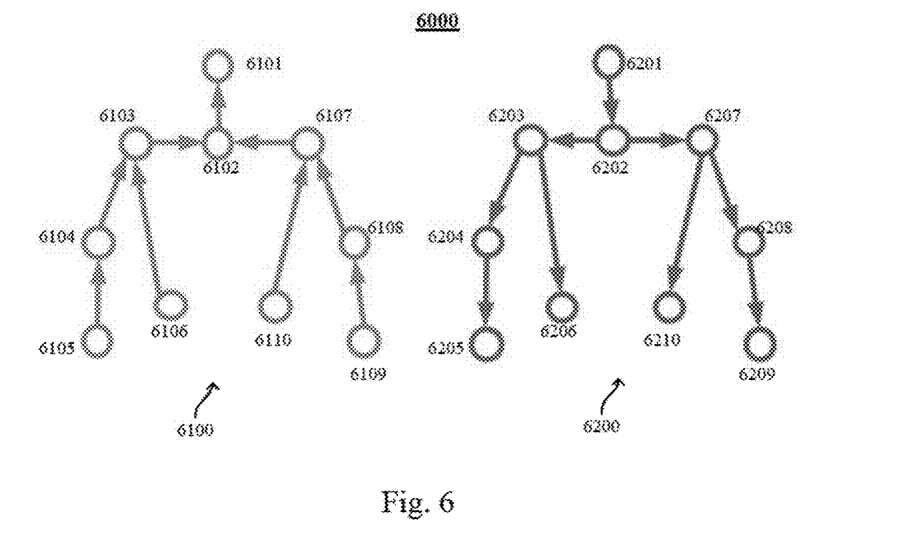
FIG. 6 is a schematic diagram illustrating a process of a bi-directional message passing according to one embodiment of the present application.

An exemplary bi-directional message passing process is illustrated in FIG. 6. While the message is passed from the bottom to the top in the part-feature network 6100, the message is passed in an opposite direction in the part-feature network 6200. The part-feature network 6100 includes leaf nodes 6105, 6106, 6109 and 6110 and other nodes 6104, 6108, 6103, 6102, 6107 and 6101. The part-feature network 6200 includes leaf nodes 6201 and other nodes 6203, 6202, 6207, 6204, 6208, 6205, 6206, 6210 and 6209. In either direction, the message is passed in a similar manner as describe above with reference to FIG. 5. Each node in the network 6100 or 6200, except for the leaf nodes 6105, 6106, 6109, 6110 and 6201, may be updated with the message passed from the upstream node. Taking the node 6104 for example, this process may be expressed with the following equation, $$A'_4 = f(A_4 + A'_5 \otimes w^{\alpha_5, \alpha_4}) \tag{2}$$

wherein $A'_4$ represents the updated part-feature maps after message passing, $A_4$ represents the part-feature maps before message passing, and $w^{\alpha_5, \alpha_4}$ represents a combination of transformation kernels between the node 6105 and the node 6104. As the node 6103 may receive messages from both the node 6104 and the node 6106, the part-feature maps at node 6103 may be updated by the following equation, $$A'_3 = f(A_3 + A'_4 \otimes w^{\alpha_4, \alpha_3} + A'_6 \otimes w^{\alpha_6, \alpha_3}) \tag{3}$$

The part-feature maps in the network 6200 may be updated in a similar way but an opposite direction, and are therefore not discussed in detail here. Finally, two sets of updated part-feature maps $[A'_6, B'_k]$ may be linearly combined into a set of score maps indicating the likelihood of the existence of the corresponding body parts.

Figure 7:
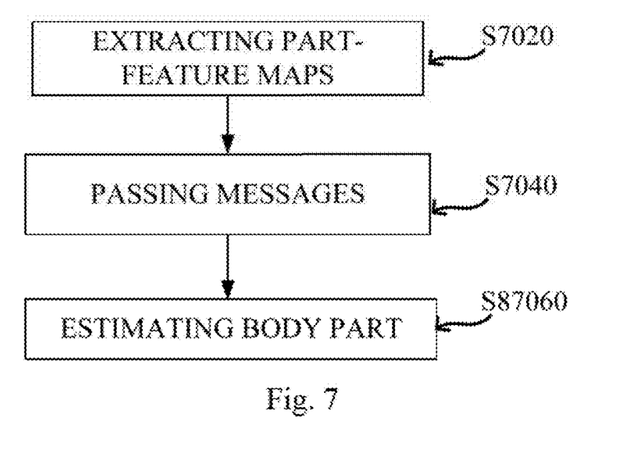
FIG. 7 is a flowchart illustrating a method for pose estimation.

FIG. 7 is a flowchart illustrating a method for pose estimation. The method may be embodied in form of instructions executable by a processor. At step S7020, a plurality of sets of part-feature maps are extracted from an image, each set of the extracted part-feature maps representing a body part and forming a node of a part-feature network. At step S7040, a message of each set of the extracted part-feature maps passes through the part-feature network to update the extracted part-feature maps, resulting in each set of the extracted part-feature maps incorporating the message of upstream nodes. At step S7060, the body part within the image is estimated based on the updated part-feature maps.

Figure 8:
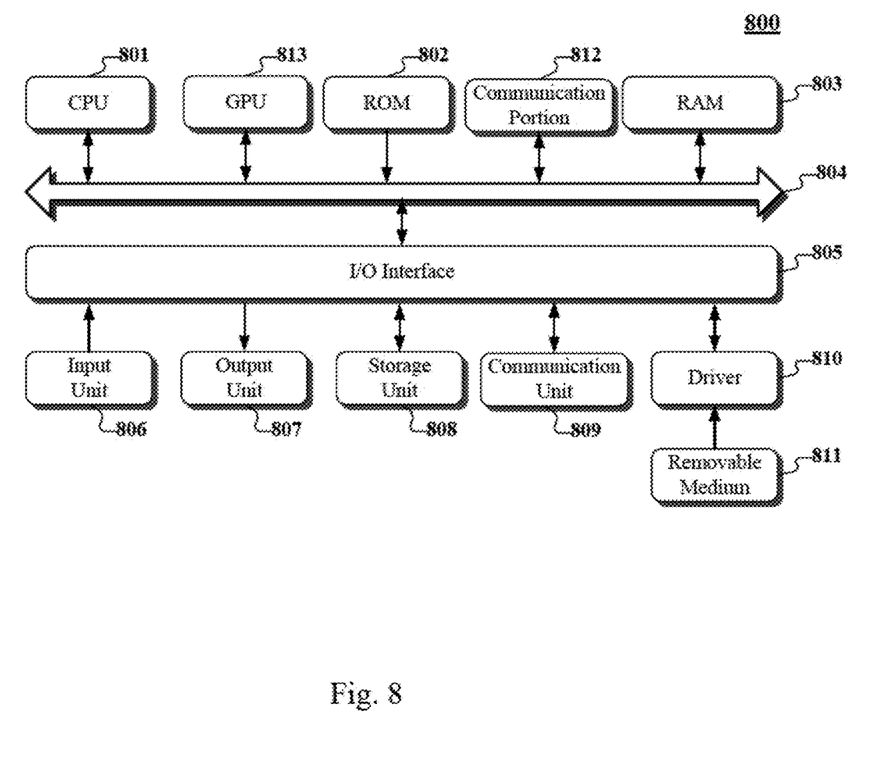
FIG. 8 is a schematic diagram illustrating a system adapted to implement the present application.

FIG. 8 is a schematic diagram illustrating a system adapted to implement the present application.

The system 800 may be a mobile terminal, a personal computer (PC), a tablet computer, a server, etc. In FIG. 8, the system 800 includes one or more processors, a communication portion, etc. The one or more processors may be: one or more central processing units (CPUs) 801 and/or one or more image processor (GPUs) 813, etc. The processor may perform various suitable actions and processes in accordance with executable instructions stored in the read-only memory (ROM) 802 or executable instructions loaded from the storage unit 808 into the random access memory (RAM) 803. The communication portion 812 may include, but is not limited to a network card. The network card may include, but is not limited to an IB (Infiniband) network card. The processor may communicate with the read-only memory 802 and/or the RAM 803 to execute the executable instructions, connect to the communication portion 812 through the bus 804 and communicate with other target devices through the communication portion 812 to complete the corresponding step in the present application. In a specific example of the present application, the steps performed by the processor includes: extracting a plurality of sets of part-feature maps from an image, each set of the extracted part-feature maps representing a body part and forming a node of a part-feature network; passing a message of each set of the extracted part-feature maps through the part-feature network to update the extracted part-feature maps, resulting in each set of the extracted part-feature maps incorporating the message of upstream nodes; and estimating, based on the updated part-feature maps, the body part within the image.

In addition, in the RAM 803, various programs and data required by operation of the apparatus may also be stored. The CPU 801, the ROM 802 and the RAM 803 are connected to each other through the bus 804. Where RAM 803 exists, the ROM 802 is an optional module. The RAM 803 stores executable instructions or writes executable instructions to the ROM 802 during operation, and the executable instructions cause the central processing unit 801 to perform the steps included in the image processing method of any of the embodiments of the present application. The input/output (I/O) interface 805 is also connected to the bus 804. The communication portion 812 may be integrated, and may also be provided with a plurality of sub-modules (e.g., a plurality of IB network cards) and connected to the bus 804, respectively.

The following components are connected to the I/O interface 805: an input unit 806 including a keyboard, a mouse, and the like; an output unit 807 including such as a cathode ray tube (CRT), a liquid crystal display (LCD) and a loudspeaker, and the like; a storage unit 808 including a hard disk, and the like; and a communication unit 809 including a network interface card such as a LAN card, a modem, and the like. The communication unit 809 performs communication processing via a network such as the Internet. A driver 810 also connects to the I/O interface 805 as needed. A removable medium 811, such as a magnetic disk, an optical disk, a magneto-optical disk, a semiconductor memory, is installed on the driver 810 as needed so that computer programs read therefrom are installed in the storage unit 808 as needed.

It should be noted that the architecture shown in FIG. 8 is only an alternative implementation. During the specific practice process, the number and types of parts as shown in FIG. 8 may be selected, deleted, added or replaced according to actual needs. Upon setting different functional parts, implementations such as separate setting or integrated setting may also be adopted, for example, the GPU and the CPU may be set separately, and again for the same reason, the GPU may be integrated on the CPU, the communication portion may be set separately, and may also be set integrally on the CPU or GPU. These alternative implementations all fall within the protection scope of the present application.

In particular, according to the embodiments of the present application, the process described above with reference to the flowchart may be implemented as a computer software program, for example, the embodiments of the present application include a computer program product, which includes a computer program tangible included in a machine-readable medium. The computer program includes a program code for performing the steps shown in the flowchart. The program code may include corresponding instructions to perform correspondingly the steps in the image processing method provided by any of the embodiments of the present application, including: extracting a plurality of sets of part-feature maps from an image, each set of the extracted part-feature maps representing a body part and forming a node of a part-feature network; passing a message of each set of the extracted part-feature maps through the part-feature network to update the extracted part-feature maps, resulting in each set of the extracted part-feature maps incorporating the message of upstream nodes; and estimating, based on the updated part-feature maps, the body part within the image.

In such embodiments, the computer program may be downloaded and installed from the network through the communication unit 809, and/or installed from the removable medium 811. When the computer program is executed by the central processing unit (CPU) 801, the above-described instruction described in the present application is executed.

As will be appreciated by one skilled in the art, the present application may be embodied as a system, a method or a computer program product. Accordingly, the present application may take the form of an entirely hardware embodiment and hardware aspects that may all generally be referred to herein as a "unit", "circuit", "module", or "system". Much of the functionality and many of the principles when implemented, are best supported with or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the present application, further discussion of such software and ICs, if any, will be limited to the essentials with respect to the principles and concepts used by the preferred embodiments. In addition, the present application may take the form of an entirely software embodiment (including firmware, resident software, micro-code, etc.) or an embodiment combining software. For example, the system may include a memory that stores executable components and a processor, electrically coupled to the memory to execute the executable components to perform operations of the system, as discussed in reference to FIGS. 1-6. Furthermore, the present application may take the form of a computer program product embodied in any tangible medium of expression having computer-usable program code embodied in the medium.

What is claimed is:

1. A method for pose estimation, comprising:
   extracting a plurality of sets of part-feature maps from an image, wherein each set of the extracted part-feature maps represents a body part and forms a node of a part-feature network;
   passing a message of each set of the extracted part-feature maps through the part-feature network to update the extracted part-feature maps, resulting in each set of the extracted part-feature maps incorporating the message of upstream nodes, wherein the passing of the message is performed twice in opposite directions and each pairs of the updated part-feature maps performed in different directions are combined into a score map; and
   estimating, based on the combined score maps, the body part within the image.

2. The method of claim 1, wherein the extracting of the part-feature maps is performed via a Convolutional Neural Network (CNN).

3. The method of claim 2, wherein the CNN is a Visual Geometry Group (VGG) net.

4. The method of claim 3, wherein three pooling layers are adopted in the VGG net.

5. The method of claim 1, wherein the passing of the message is performed by a convolution operation with a geometrical transformation kernel.

6. A system for pose estimation, comprising:
   a memory that stores executable components; and
   a processor electrically coupled to the memory to execute the executable components for:
     extracting a plurality of sets of part-feature maps from an image, wherein each set of the extracted part-feature maps represents a body part and forms a node of a part-feature network;
     passing a message of each set of the extracted part-feature maps through the part-feature network to update the extracted part-feature maps, resulting in each set of the extracted part-feature maps incorporating the message of previously passed nodes, wherein the passing of the message is performed twice in opposite directions and each pairs of the updated part-feature maps performed in different directions are combined into a score map; and estimating, based on the combined score maps, the body part within the image.

7. The system of claim 6, wherein the extracting of the part-feature maps is performed via a Convolutional Neural Network (CNN).

8. The system of claim 7, wherein the CNN is a Visual Geometry Group (VGG) net.

9. The system of claim 8, wherein three pooling layers are adopted in the VGG net.

10. The system of claim 6, wherein the passing of the message is performed by a convolution operation with a geometrical transformation kernel.

11. A non-transitory computer readable storage medium for storing computer readable instructions executable by a processor to perform operations, the operations comprising:

extracting a plurality of sets of part-feature maps from an image, wherein each set of the extracted part-feature maps represents a body part and forms a node of a part-feature network;

passing a message of each set of the extracted part-feature maps through the part-feature network to update the extracted part-feature maps, resulting in each set of the extracted part-feature maps incorporating the message of upstream nodes, wherein the passing of the message is performed twice in opposite directions and each pairs of the updated part-feature maps performed in different directions are combined into a score map; and estimating, based on the combined score maps, the body part within the image.

12. The non-transitory computer readable storage medium of claim 11, wherein the extracting of the part-feature maps is performed via a Convolutional Neural Network (CNN).

13. The non-transitory computer readable storage medium of claim 12, wherein the CNN is a Visual Geometry Group (VGG) net.

14. The non-transitory computer readable storage medium of claim 13, wherein three pooling layers are adopted in the VGG net.

15. The non-transitory computer readable storage medium of claim 11, wherein the passing of the message is performed by a convolution operation with a geometrical transformation kernel.

* * * * *